United States Patent [19]
Erland

[11] Patent Number: 5,972,440
[45] Date of Patent: Oct. 26, 1999

[54] FLOATING SEGMENTED CONGLOMERATE TRAVELING MATTE BACKING

[76] Inventor: Jonathan Erland, 6026 Hayes Ave., Los Angeles, Calif. 90042

[21] Appl. No.: 08/928,743

[22] Filed: Sep. 12, 1997

Related U.S. Application Data

[63] Continuation-in-part of application No. 08/729,630, Oct. 10, 1996
[60] Provisional application No. 60/025,233, Sep. 13, 1996, and provisional application No. 60/004,996, Oct. 10, 1995.

[51] Int. Cl.⁶ .............................. G03B 21/26; A63J 5/00; H04N 9/74
[52] U.S. Cl. ............................ 428/33; 428/34.1; 428/45; 428/52; 428/80; 428/913; 348/587; 352/45; 352/46; 352/89; 353/30; 353/121
[58] Field of Search .............................. 428/33, 34.1, 45, 428/52, 80, 913; 352/89, 45, 46; 348/584; 353/30, 121

[56] References Cited

U.S. PATENT DOCUMENTS

| | | | |
|---|---|---|---|
| 3,778,542 | 12/1973 | Hanseman | 348/587 |
| 4,406,529 | 9/1983 | Anthony | 353/30 |

Primary Examiner—Terrel Morris
Attorney, Agent, or Firm—Morrison & Foerster LLP

[57] ABSTRACT

A floating segmented conglomerate backing screen for use in underwater composite photography. A plurality of buoyant pads of an essentially hexagonal shape have surfaces exhibiting specific chrominance and luminance properties as required for a traveling matte process. The individual segments are deployed onto a liquid surface of a finite area in a quantity sufficient to substantially cover the liquid surface in its entirety, in an edge-to-edge, floating, conglomerate relationship. The floating raft created by the segments permits egress and ingress for people and equipment directly through the raft and likewise permits the escape of air rising from below the surface. When appropriately illuminated from either below or above the surface, or both, the chrominance and luminance of the raft is such that an essentially monochromatic backing field is provided for traveling matte processes. The individual segments are constructed of an inert plastic such as polypropylene, polystyrene, polyurethane or similar plastic which has inclusions of inert gas and is compounded with dyes and pigments, which may include fluorescence, to achieve either black or white or any of a variety of specific spectral loci and luminances, for the purpose of providing a precise chromatic actinic stimulus response for a silver halide photographic film, or similar response for electronic imaging devices. Foreground subject matter interposed between the camera and the segmented conglomerate backing will therefore be readily distinguished and "matted" for compositing by methods well known to the art.

17 Claims, 8 Drawing Sheets

SPECTRAL SENSITIVITY

FIG. 8

FLOATING SEGMENTED CONGLOMERATE TRAVELING MATTE BACKING

This application is based upon U.S. Provisional application Ser. No. 60/025,233 filed Sep. 13, 1996, and is a continuation-in-part application of copending U.S. Pat. application Ser. No. 08/729,630 filed Oct. 10, 1996, which is in turn based on U.S. provisional application Ser. No. 60/004,996 filed Oct. 10, 1995.

BACKGROUND OF THE INVENTION

1. Field of Invention

The present invention relates to composite photography, and more particularly to floating backing screens having improved chromatic actinic stimulus for color difference composite photography, cinematography, videography and solid state digital imaging.

2. Art Background

In motion picture production, it is often impractical, impossible or simply uneconomical to place actors in the specific environments to be depicted. To resolve this problem, various techniques have evolved over the years to composite such scenes from separately filmed "elements." The patent literature contains a great deal of teaching in this field. A comprehensive discussion is to be found in my prior patents. See U.S. Pat. Nos. 4,417,791, 4,548,470 and especially 4,629,298. Reference is also made to the American Cinematographer Manual, Seventh Edition, pp. 430–466, with particular emphasis on the section titled "Screen Types and Lighting" pp. 434–437. With these references in mind, the present discussion will be confined to a summary of the evolution of traveling matte technique.

The earliest efforts at composite photography generally resorted to animation, as in Georges Milies' "Trip to the Moon" (1902). Thereafter, techniques such as the "held/take" process were utilized, in which a scene was shot with predetermined areas of the successive frames blocked off with an opaque "matte" in order to preclude exposure thereof. The unexposed portions of the successive frames were thereafter exposed to the desired foreground subjects, with the background areas "matted" to protect the previously recorded latent images. Essentially the same process is used to incorporate a painting which depicts a distant, dangerous, or totally alien scene against which the actors are to appear; this is known as matte painting. In order to depict actors or other foreground subjects moving in front of the desired background scenes, it became necessary to produce "mattes" that would change from frame to frame, or "travel." Various techniques were developed over the years to accomplish this.

Early processes relied upon contrast alone, the foreground action being filmed against a jet black backing and the resulting image being printed through several generations of high contrast film stock or alternatively, having the image chemically "intensified" until a matte was produced. One example of this technique is described in U.S. Pat. No. 1,273,435 to Frank Williams in 1918.

The results obtained by this technique were generally quite poor, due to the inevitable distortion produced by the multiple reversals or the intensification which result in "haloes" or "fringes" occurring between the scene elements. Efforts to address these problems led to the exploitation of the chromatic response of black and white photographic film and resulted in the Dunning-Pomeroy process (U.S. Pat. No. 1,613,163 to Carrol D. Dunning, 1927) and another Williams process (U.S. Pat. No. 2,024,081, Dec. 10, 1935). With the advent of color film recording, notably the Technicolor process, the chromatic based systems began to proliferate. (See U.S. Pat. Nos. 2,693,126, and 2,740,712 to W. E. Pohl.).

The fundamental concept that makes it possible to derive a matte from a polychromatic photographic image is based on the fact that the superimposition of positive and negative images will cancel each other out and yield an opaque image. Thus it follows that if a given portion of the image is comprised of a pure monochromatic object, i.e. blue, this portion will appear as light in a print of the film record that is sensitive to blue and dark in prints of the film records that are not sensitive to blue, i.e. the red and green records. Therefore, if the red negative record, in which the "blue" object appears light, is superimposed with the blue positive record, in which the blue object also appears light, the blue object will remain the only significant "light" object in the scene, all polychromatic portions of the scene having canceled each other out to yield an opaque image. It is then straightforward to produce a set of positive and negative high contrast "mattes" and employ these to print, in succession, the foreground and background elements of a composite scene.

With the advent of monopak color photographic film, it became possible to devise the ever more sophisticated color difference traveling matte techniques exemplified by Petro Vlahos' U.S. Pat. No. 3,158,477. As the compositing technology evolved to produce more convincing results, the requirements for the original photography of the "bluescreen" element became increasingly severe. Much ingenious attention was focussed on this area, and some of the results achieved have been recognized with patents and Academy of Motion Picture Arts and Sciences Scientific and Engineering Awards. Among these are: Eastman Kodak for color negative EC 5295, a film designed expressly for Bluescreen traveling matte photography (1987), the Stewart Traveling Matte Transmission Bluescreen backing (1964), the Reverse Bluescreen Process (1983) (U.S. Pat. No. 4,417, 791) and the Blue-Max Blue Flux Front Projector (1984) (U.S. Pat. No. 4,629,298). The ultimate sophistication in traveling matte image acquisition is achieved with the Reverse Front Projection process described in the American Cinematographer Manual, p. 457, which solves a host of problems. This technique provides great control over chrominance and luminance and essentially cancels any prospect of "spill" and unwanted reflections.

The latest advances in compositing technology exploit the capacity of computer image manipulation processes and digital film scanning and printing techniques, and have vastly expanded the application and efficacy of composite photography. The catalogue of Petro Vlahos' patents in the field traces the development and increasing sophistication of electronic compositing. While the below listed patents describe the electronic hardware embodiments of the process, these have all now been implemented in computer software for digital electronic composites: 3,595,987 4,007, 487 4,100,560 4,344,085 4,409,611 4,589,013 4,625,231

Additionally, in 1992, Eastman Kodak Company developed an effective film digitizing scanner and a complementary film printing laser. These systems and others produced by different manufacturers provide extensive software programs covering every facet of compositing and image manipulation technique. It is now possible to create composites containing an infinite number of elements without any degradation of image quality from the original digital scan through to the laser film output. The most subtle image attributes can be retained, including extremely fine detail such as strands of hair, as well as the all important motion blurred edges of moving objects. Translucent objects such as glass, water and smoke may now be routinely rendered in totally convincing "seamless" composites.

The extremely high demands such sophisticated computer compositing programs make on original traveling matte photography can demonstrably be met by the previously described technology such as Blue-Max (R) front projection, Reverse Front Projection and the like. However, these techniques, as sophisticated in their way as the computer programs, are technologically complex and time consuming to employ. The immense proliferation of composite photography occasioned by the facility and efficacy of digital composite technology require the development of simple, effective and economical techniques for achieving the original image or "bluescreen element."

Throughout this discussion, the process has been described by the term "Bluescreen." This is explained by the fact that for most of the history of the process the backing color of choice, and frequently of necessity, has been blue. While it is possible to perform photochemical optical traveling matte composites using any primary color backing, there has been a persuasive technological rationale for confining the process to the blue version. With the advent of the digital electronic processes described above, the range of backing colors is expanded to include all the primaries and indeed, their complements. Further, freed from the constraints entailed in the photochemical process, the advantages to be found in matting on the green record can now be readily accessed. A full discussion of the relative merits of blue versus green is not warranted here beyond the mention of some of the more obvious attributes involved.

In monopak color film, particularly that balanced for Tungsten light, the Blue sensitive record is, of necessity, comprised of a faster, and hence, grainier record than either Red or Green. This is due to the relative paucity of blue light available in the Tungsten spectrum. In fact, the film emulsion designers make a major effort to provide the green record with the highest possible image attributes. Thus many aspects of perceived image quality such as resolution, tone scale, acutance, and so on are delivered to the viewer via the green record of the monopak color film. (A similar situation also prevails in video imaging devices, where the bandwidth assigned to the respective color channels was derived from the visual response of the human eye; thus the Green channel is some 59%, versus approximately 30% for the Red and only 11% for the Blue.) In most photochemical compositing techniques, this attribute of the green record was superfluous, as the "matte" record, usually blue, was reduced to a high contrast black and white matte. By contrast, in a sophisticated digital electronic computer compositing system, the matte record is rendered as a continuous tone black and white image. Actually, the matte should no longer be thought of as an "image," but rather as a signals matrix containing the instructions for combining the relative proportions of both foreground and background picture elements (or pixels) which will comprise the eventual composite image. This is now known as the Alpha channel. For a comprehensive discussion of the Alpha channel, see "Compositing Digital Images," Thomas Porter and Tom Duff, in Computer Graphics, Vol. 18, No. 3, p. 254, July 1984, in which the concept was introduced. Mattes produced using this technology are capable of readily reproducing the most subtle image attributes including translucent objects such as smoke and water, filmy fabrics, and, importantly, the edge blur of rapidly moving objects in the scene, as well as shadows. Such attributes were relatively much harder to render in photochemical optical composites, though by no means impossible, when a highly skilled practitioner of the art was involved.

The most significant issues noted above are those of "motion blur" and "shadows." In these situations, the compositing system will be combining proportions of both foreground and background portions of the scene together. It is desirable that a shadow cast by the foreground scene onto the background matte field will retain enough image density to record in the Alpha channel, or matte, as a smooth quiet signal. The same is true for the reduced background signal occurring in the area of "motion blur" when a rapidly moving portion of the foreground subject is partially, though not completely, obscuring the background matte field. A great deal of filmed traveling matte footage is transferred to video via a telecine device, the leading such device in the industry being the Rank Telecine. This is essentially a flying spot scanner device employing a CRT source together with optics, such that a film image frame is scanned by the CRT "spot" whereby each pixel is coded into its component parts and stored as data. The device is handicapped by the fact that the CRT phosphors employed are essentially green in color, requiring excessive amplification of the relatively weak signal derived from the blue record of film. Thus the relative grainy record of Tungsten balanced negative film is exacerbated by the excessive electronic amplification resulting in what is termed "noisy" mattes. Quite obviously, deriving a matte signal from the fine grain green record of the same film illuminated by an essentially green phosphor CRT tube will produce an electronically very "quiet" matte.

Another, small advantage of matting on the green record is derived from the fact that the optics of the camera are designed mainly around the green portion of the spectrum and, assuming the camera has been properly focussed, the very best focus will occur for the green record, with very deep red objects suffering slightly by comparison.

Further discussion on the relative merits of Blue versus Green may be found in Ultimatte Technical Bulletin No. 2, "Green or Blue-Selecting a Backing Color for an Ultimatte Composite." (Published by the Ultimatte Corporation, manufacturer of Petro Vlahos' inventions previously referred to.) After a discussion of the many complex issues, the bulletin concludes, "There are no simple rules for specifying when to use a blue or green backing. Each situation must be analyzed to see whether a blue or a green backing will yield better results."

When required by the environment depicted by the storyline, the traveling matte process has to be conducted underwater. Fabric backings as described in my pending Provisional Application No. 60/004,996 filed Oct. 10, 1995, provide excellent physical properties in this environment. The exception to this case is found when the backing is required to form the surface plane of the water environment. While it would be possible to cover the water surface with the fabric backing, this would impede the ingress and egress of people and objects into the tank or pool. Likewise the inevitable air bubbles rising to the surface from breathing equipment, etc. within the tank would tend to form large bubbles which would be trapped at the interface of the water surface and the fabric backing. Such bubbles would then create the optical effect of a mirror surface as viewed from below destroying the monochromatic field required by the traveling matte process. Therefore, a new configuration of a backing screen is desired to be developed to address these drawbacks in the prior art.

SUMMARY OF THE INVENTION

The present invention provides an improved backing screen having particular application for use in composite photography. In particular, the present invention relates to color difference composite photography, whether still, motion picture, video, solid state digital electronic or electrophotographic imaging, in which foreground and background scenes are separately recorded and subsequently combined using known "blue screen" or special color background techniques to form a single image. The present invention provides for a floating segmented conglomerate backing screen comprised of a plurality of buoyant pads of an essentially hexagonal shape which exhibit specific chrominance and luminance properties as required for the traveling matte process. The individual segments are deployed onto a liquid surface of a finite area in a quantity sufficient to substantially cover the liquid surface in its entirety, in an edge-to-edge, floating, conglomerate relationship. If the surface area is larger than the raft area required, the raft can be contained and positioned via a floating boom such as is employed to define lanes in a swimming pool. The floating raft created by the segments permits egress and ingress for people and equipment directly through the raft and likewise permits the escape of air rising from below the surface.

When appropriately illuminated from either below or above the surface, or both, the chrominance and luminance of the raft is such that an essentially monochromatic backing field is provided for traveling matte processes. The individual segments are constructed of an inert plastic such as polypropylene, polystyrene, polyurethane or similar plastic which has inclusions of inert gas to provide buoyancy and is compounded with dyes and pigments, which may include fluorescence which is primarily reactive to the visible spectrum, to achieve either black or white or any of a variety of specific spectral loci and luminances, for the purpose of providing a precise chromatic actinic stimulus response for a silver halide photographic film, or similar response for electronic imaging devices. Foreground subject matter interposed between the camera and the segmented conglomerate backing will therefore be readily distinguished and "matted" for compositing by methods well known to the art.

DETAILED DESCRIPTION OF THE ILLUSTRATED EMBODIMENTS

A backing screen is disclosed having particular application for use in color difference traveling matte composite photography. In particular, the present invention relates to composite color photography, whether still, motion picture, video or solid state digital electronic imaging in which foreground and background scenes are separately recorded and subsequently combined, using known "blue screen" or special color background techniques, to form a single image.

Figure 1A:
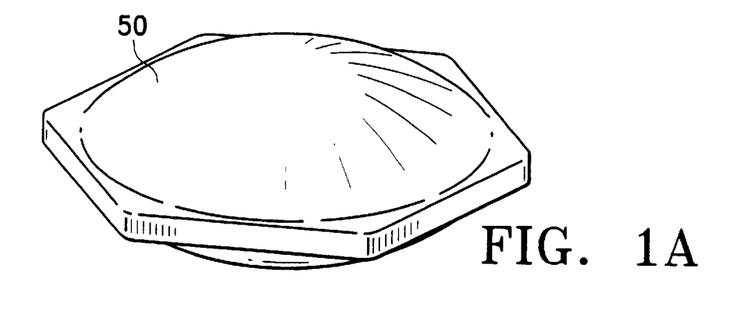
FIG. 1A is a perspective view of the floating matte segment in accordance with one embodiment of the present invention.
Figure 1B:
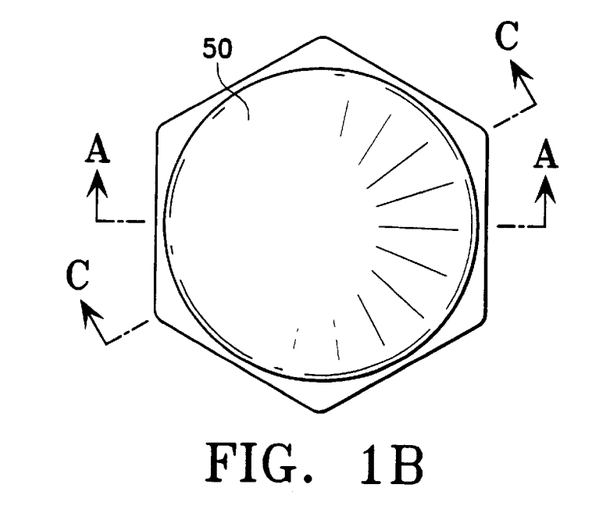
FIG. 1B is a top plan view of the segment of FIG. 1A.
Figure 1C:
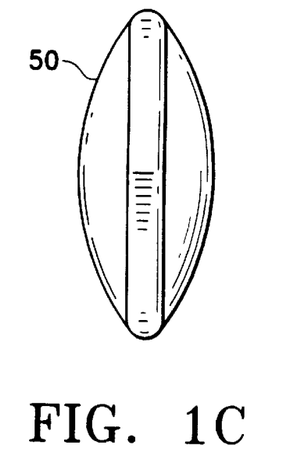
FIG. 1C is a edge view of the segment of FIG. 1A.
Figure 1D:
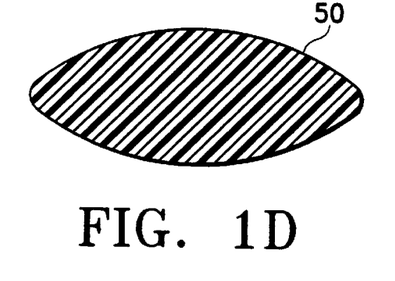
FIG. 1D is a sectional view taken along line A—A in FIG. 1B.
Figure 1E:
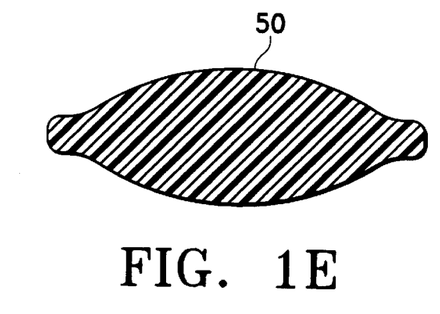
FIG. 1E is a sectional view taken along line C—C in FIG. 1B.
Figure 2A:
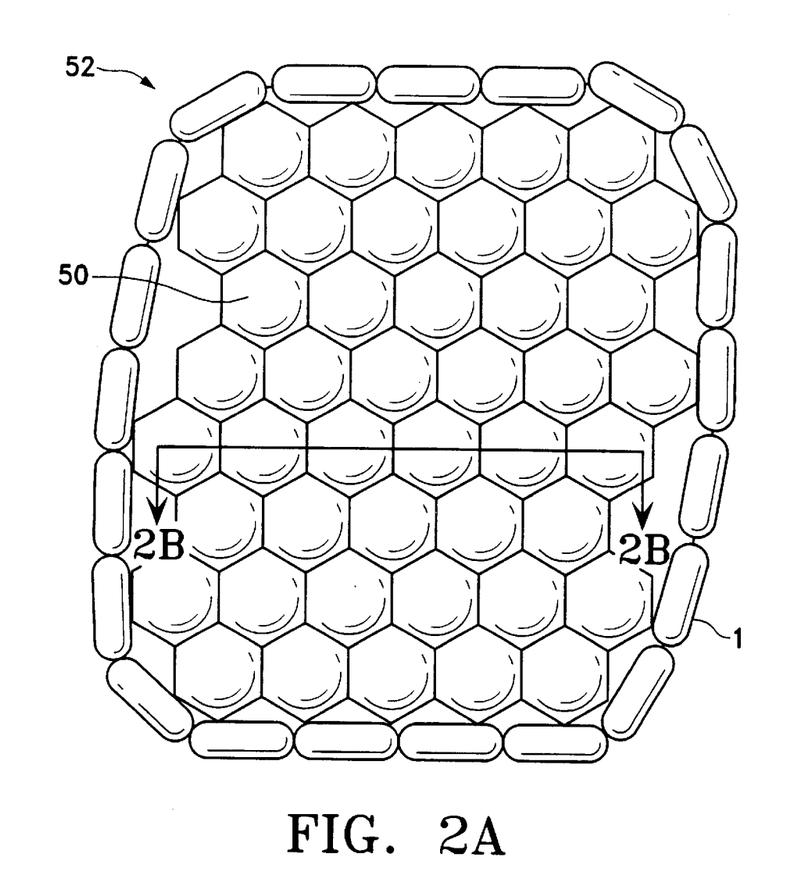
FIG. 2 illustrates the arrangement of the floating matte segments on water.
Figure 2B:
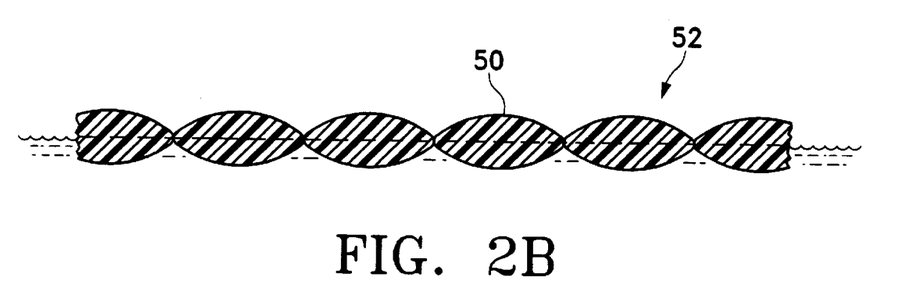
FIG. 2B is a sectional view taken alone line 2B—2B in FIG. 2A.

The present invention overcomes the deficiencies of the prior art by providing for a floating segmented conglomerate backing screen comprised of a plurality of buoyant pads of an essentially hexagonal shaped pillow which exhibit specific chrominance and luminance properties as required for the traveling matte process. The individual segments 50, as shown in FIGS. 1A–E, are deployed onto a liquid surface of a finite area in a quantity sufficient to substantially cover the liquid surface in its entirety in an edge to edge (at the water line) floating conglomerate relationship, forming a raft (see FIGS. 2A and 2B). The segments 50 are free floating and they are not structurally interconnected. If the surface area is larger than the raft area required, the raft 52 can be contained, as shown in FIG. 2A, and positioned via a floating boom 1 such as is employed to define lanes in a swimming pool. As can be more easily appreciated by reference to FIG. 2B, the floating raft 52 created by the discrete segments 50 permits egress and ingress for people and equipment directly through the raft 52 by pushing aside the segments 50. Likewise, the raft 52 permits the escape of air rising from below the surface through the adjoining segments 50. When appropriately illuminated from either below or above the surface, or both, the chrominance and luminance of the raft is such that an essentially monochromatic backing field is provided for traveling matte process.

To deploy the segments 50 to cover the confined area of the floating boom 1, an appropriate number of the segments 50 having a total area sufficient to cover the confined area are thrown randomly into the confined area. It has been found that the segments would float randomly on the water surface and settle into the tiled configuration shown in FIG. 2A. The segments would rest at their preferred equilibrium position in which each segment would freely float on the water surface and not resting on another segment. Slight agitation of the water surface by a person may be required to assist the segments in reaching their equilibrium position. Preferably, the surface segments 50 should have a texture that is smooth and have a surface characteristic that would minimize the likelihood of adhesion or trapping of air bubbles.

The individual segments are constructed of an inert plastic such as polypropylene, polystyrene, polyurethane or similar plastic by injection molding, for example, which has inclusions of inert gas and is compounded with dyes and pigments, which may include fluorescence, to achieve either black or white or any of a variety of specific spectral loci and luminances, for the purpose of providing a precise chromatic actinic stimulus response for a silver halide photographic film, or similar response for electronic imaging devices. Alternatively, the segments may be painted with the appropriate pigments.

It is noted that the relative sizes of the floating boom 1 and the segments 50 in FIG. 2A are not drawn to scale. The size of the segments may range from a few centimeters to tens of centimeters measured between opposite sides (Section A—A in FIG. 1D). However, it is believed that segments of smaller sizes allow for more random and even distribution of the segments over the water surface and equilibrium position to be more easily reached. The segments 50 may be constructed to have a thin walled hollow body instead of a substantially solid body as shown in FIGS. 1D and 1E. The body may be filled with an inert gas to provide buoyancy. Further, instead of hexagon shape, the segments may be of a square, rectangle, triangular or other geometrical shapes. However, it is believed that segments of hexagon shape allow for better packing characteristics (i.e., tighter, more even and homogeneous coverage). The surface of the segments is relatively smooth and texture-less, to avoid trapping air bubbles and reduce friction between segments which might otherwise result in overlapping segments.

For solid body segments made of polypropylene, each segment displaces about half its volume of water. Given that the cross-section of the segments is a flat oval (see FIGS. 1D and E), the floatation of the segments on the water is stabilized by the rounded bottom of the segments.

Figure 3:
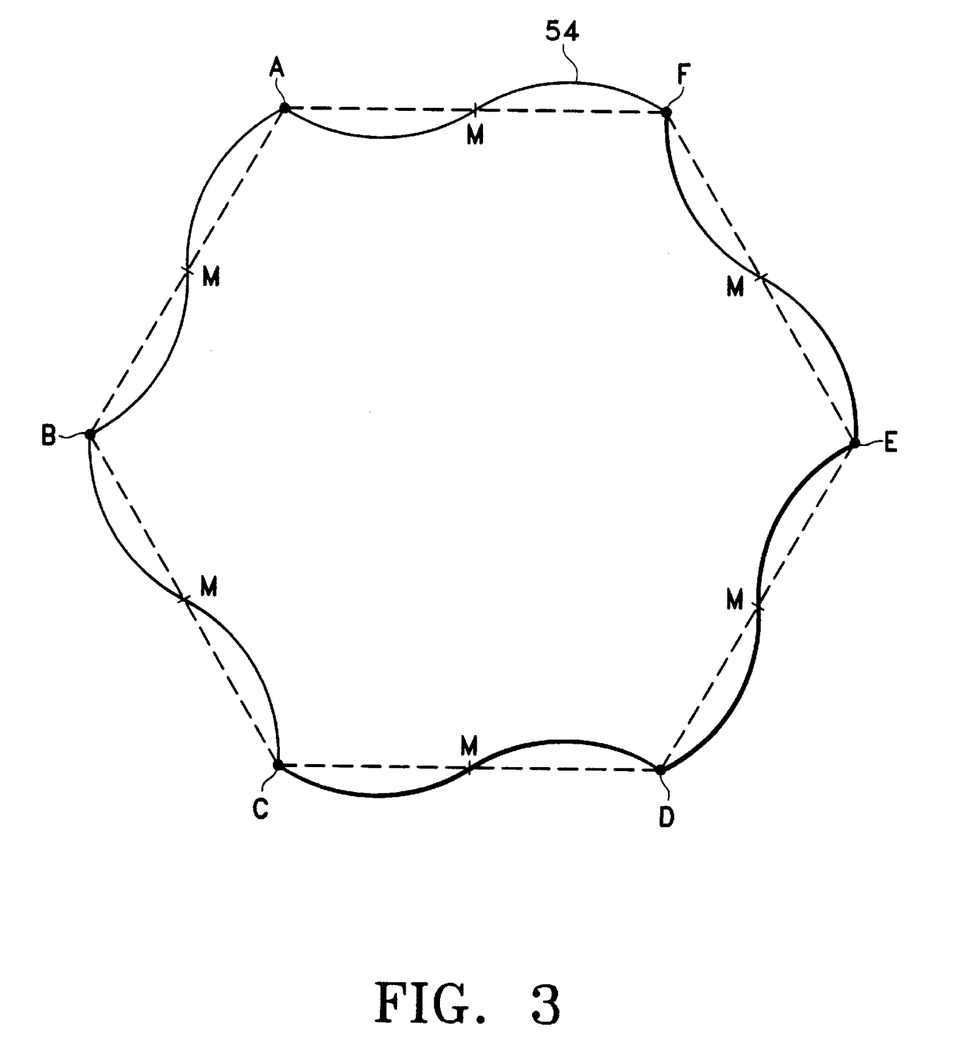
FIG. 3 is a top plan view illustrating the edge profile of a floating segment in accordance with another embodiment of the present invention.

FIG. 3 illustrates another embodiment of a buoyant segment 54 comprised of a modified hexagonal shape, in which the edges of the hexagon are provided with a sine wave profile. The wavy edges allow for improved interlocking relationship between adjacent segments 54. Further, from a visual perspective, a wavy edge interface between adjoining segments 54 as compared to a straight edge interface results in a more random 'noise' pattern in the resulting matte backing. The net effect is that random noise in the matte backing is more easily disguised than a more regular noise pattern.

Foreground subject matter interposed between the camera and the backing will therefore be readily distinguished and "matted" for compositing by methods well known to the art.

Figure 4:
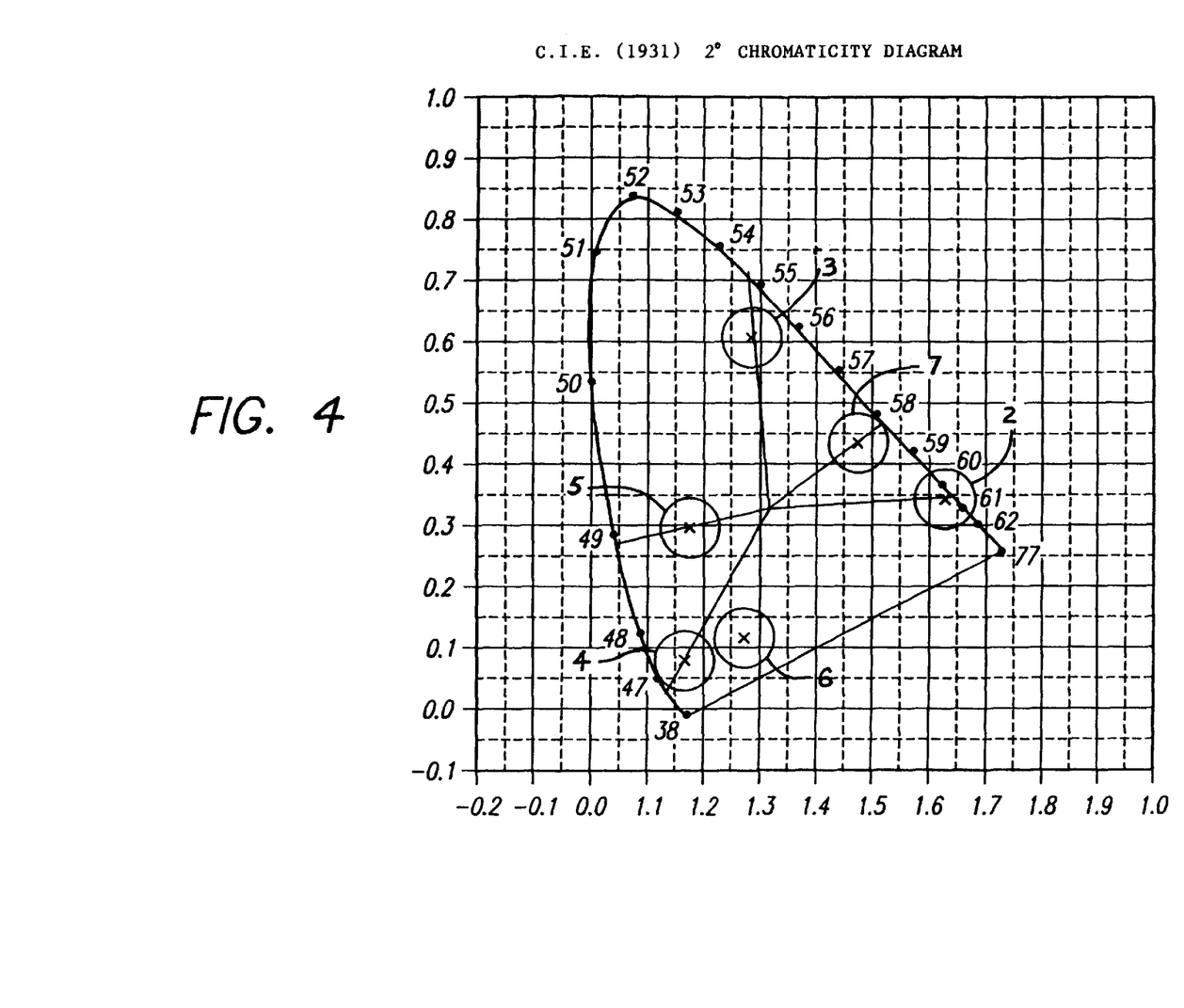
FIG. 4 illustrates a C.I.E. (1931) chart showing the chromaticity coordinates of the various optimal spectral loci of matte backings of the present invention.
Figure 5:
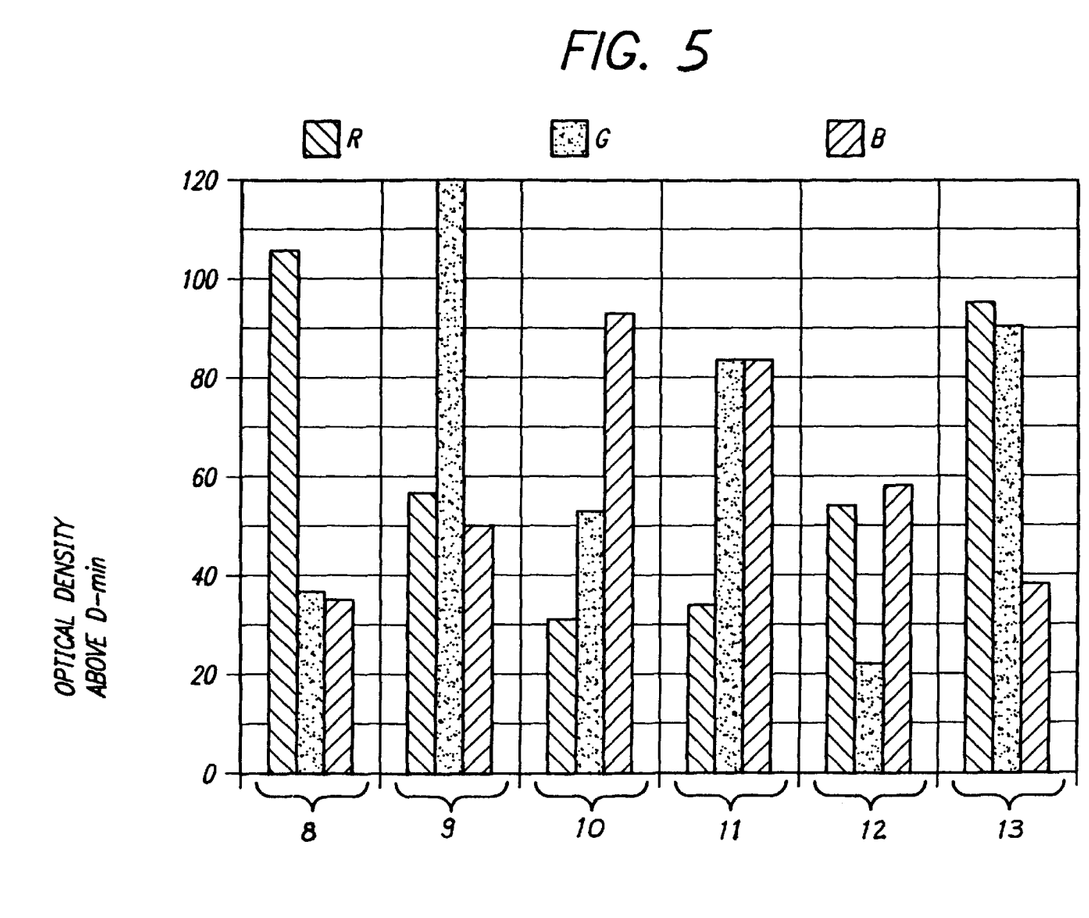
FIG. 5 illustrates several sets of bar graphs corresponding to the optical densities in the negative above D-min of Red, Green and Blue for Red, Green, Blue, Cyan, Magenta and Yellow loci in FIG. 4.

The optimal spectral loci with which the segments are provided can be designated as illustrated in FIG. 4 using C.I.E. (Commission Internationale de l'Eclairage) (1931) 2° chromaticity coordinates, with C.I.E. Illuminant D65, as follows:

Red locus 2 in FIG. 4 is represented as a circular area with a focal point located at coordinates x=0.6300 and y=0.3450 and with a radius of 0.05 of the C.I.E. scale, a dominant wavelength of 605 n.m., a purity of at least 80% and a luminance greater than 58%. When exposed to EC 5293 under Kodak LAD "laboratory aim density" standard conditions, this backing producing densities (in accordance with ANSI/ISO 5/3-1984 standards) in the negative above D-min of Red: 106; Green: 37; Blue: 35, as illustrated by graph 8 in FIG. 5.

Green locus 3 in FIG. 4 is represented as a circular area with a focal point located at chromaticity coordinates x=0.2850 and y=0.6100 and with a radius of 0.05 of the C.I.E. scale, a dominant wavelength of 547 n.m., a purity of at least 60% and a luminance greater than 78%. When exposed to EC 5293 under Kodak LAD standard conditions, this backing typically produces densities in the negative above D-min of Red: 57; Green: 120; Blue: 50, as illustrated by graph 9 in FIG. 5.

Blue locus 4 in FIG. 4 is represented by a circular area with a focal point located at chromaticity coordinates x=0.1650 and y=0.0800; a radius of 0.05 of the C.I.E. scale; a dominant wavelength of 462 n.m.; a purity of at least 70%; and a luminance greater than 10%. When exposed to EC 5293 under Kodak LAD standard conditions, this backing produces densities in the negative above D-min of Red: 31; Green: 53; Blue: 93, as illustrated by graph 10 in FIG. 5.

Cyan locus 5 in FIG. 4 is represented by a circular area with a focal point located at chromaticity coordinates x=0.1750 and y=0.3000; a radius of 0.05 of the C.I.E. scale; a dominant wavelength of 488 n.m.; a purity of at least 25%; and a luminance greater than 30%. When exposed to EC 5293 under Kodak LAD standard conditions, this backing produces densities in the negative above D-min of Red: 34; Green: 83; Blue: 83, as illustrated by graph 11 in FIG. 5.

Magenta locus 6 in FIG. 4 is represented by a circular area with a focal point located at chromaticity coordinates x=0.2700 and y=0.1150; a radius of 0.05 of the C.I.E. scale; a dominant wavelength of 560 C n.m.; a purity of at least 52%; and a luminance greater than 25%. When exposed to EC 5293 under Kodak LAD standard conditions, this backing produces densities in the negative above D-min of Red: 54; Green: 22; Blue: 58, as illustrated by graph 12 in FIG. 5.

Yellow locus 7 in FIG. 4 is represented by a circular area with a focal point located at chromaticity coordinates x=0.4750 and y=0.4400; a radius of 0.05 of the C.I.E. scale, a dominant wavelength of 582 n.m.; a purity of at least 60%; and a luminance greater than 80%. When exposed to EC 5293 under Kodak LAD standards, this backing produces densities in the negative above D-min of Red: 95; Green: 90; Blue: 38, as illustrated by graph 13 in FIG. 5.

To achieve the high chrominance and high luminance desired for optimal matte performance, the buoyant segments of the present invention are treated with specific dyes as required to provide either Red, Green, Blue, Cyan, Magenta or Yellow. These dyes employ fluorescence as the mechanism by which to achieve enhanced chrominance and luminance. In particular, they employ a class of fluorescent dyes known as daylight-fluorescence which are capable of excitation by a broad spectrum of radiation from ultraviolet into the visible region. Thus, the need for supplemental filtered light specific to the backing screen is reduced or eliminated by the conversion mechanism of fluorescence whereby radiation of undesirable shorter wavelengths are absorbed and converted to the desired wavelength; i.e. blue and green light can be absorbed, converted and re-emitted as red light.

There are relatively few such fluorescent dyes to choose from, and these have to be manipulated in specific ways in order to produce the desired result. The effective phosphor for the green dye, for example, is actually the greenish-yellow coumarin dye Alberta Yellow (Solvent Yellow 135) with a dominant emission of 563.2 n.m. However it has strong emission from 530 n.m. through 560 n.m. It is therefore attenuated with the addition of a small amount (on the order of 2–6%) of phthalocyanine green dye which acts as an absorption filter to suppress the longer wavelengths below 560 n.m., yielding C.I.E. data as follows: x=0.2843, y=0.5676, a dominant wavelength of 545 nm.; and at least a luminance of 75%; and a purity of 60.32%.

Figure 6:
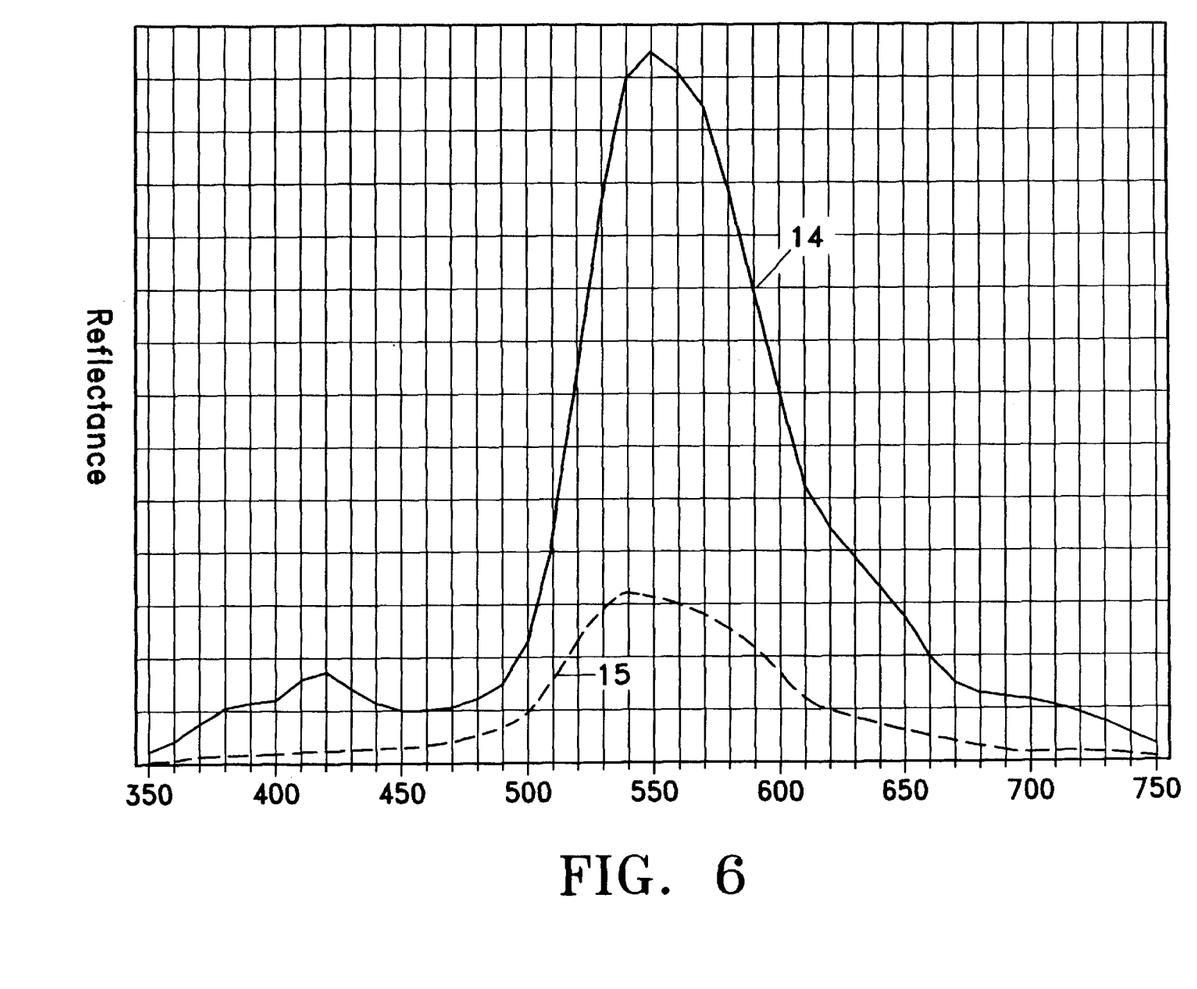
FIG. 6 is a graph comparing the spectral reflectance of green matte backings of the present invention and the prior art.

When illuminated by C.I.E. Standard Illuminant D65 (i.e. a daylight reference), an optimal exposure is recorded on motion picture film (or other recording device) in which the backing screen records as one and a half "stops" greater than a standard 18% photographic grey card illuminated by the same source. (A photographic "stop" represents a measure of the actinic speed of the photographic process, where the quanta of actinic radiation is doubled for each progressively larger stop. The speed of the photographic process can be affected by altering the quanta of radiation at the subject, the aperture of the lens at the camera, or the actinic sensitivity of the film or other sensor.) When read in a densitometer, the developed negative will typically show readings (above minimum density or D-Min) of Red: 58; Green: 120; and Blue: 50 and display the spectral traces shown in FIG. 6, curve 14.

For comparison, the industry standard green fabric screen (i.e. "Tempo") analyzed under identical circumstances yields the following C.I.E. data: x=0.2874, y=0.5199; a dominant wavelength of 544.1 nm.; a luminance of 28.8%; and a purity of 47.61%. When illuminated by C.I.E. Standard Illuminant D65 (i.e. a daylight reference), the industry standard fabric records as one half stop lower than a standard 18% photographic grey card illuminated by the same source. When read in a densitometer, the developed negative will typically show readings (above D-Min) of Red: 41; Green: 79; and Blue: 37, and display the spectral traces shown in FIG. 6, curve 15. Thus the backing screen of the present invention yields a substantial improvement in terms of density and color separation in the developed negative, and consequently greatly facilitates the processing of the matte signals. A very significant attribute of the present invention is that the two stop increase in photographic "speed" described above can quite readily translate into a reduction of seventy-five percent of the lighting apparatus normally required. The provision and operation of such apparatus constitutes a major expense in motion picture production, and reductions on scale of seventy-five percent result in very substantial savings.

For the Red screen version, a further manipulation is affected which exploits the ability to transfer energy from one fluorescent dye to another. Thus, the Alberta Yellow dye has added to it Rhodamine F5G (normally a "salmon" or slightly magenta orange). The result is that the emission from the Alberta Yellow is reabsorbed by the Rhodamine and added to the excitation already occurring by the Standard illuminant. However, the Alberta Yellow is meanwhile absorbing the blue violet component of the Rhodamine emission, thus canceling it from the total emission and adding it to the orange component. To this arrangement, still another dye is introduced: Rhodamine B (Basic Violet 10) normally, as its name suggests, a violet color with deep red and deep blue-violet components. The result is that the Rhodamine B now absorbs the emission of the previous combination again, in addition to that of the Standard Illuminant, while simultaneously having its blue-violet component absorbed and re-emitted in the 600 n.m. region (or red). All of this conversion and reconversion give rise to a cascading fluorescence effect which results in a very efficient emitter of red illumination having the appearance of being internally powered as in an electro-luminescent device.

For the Blue version, relatively less assistance is required from fluorescence, as an excessively high luminance in a Blue traveling matte backing will cause a phenomena known as "cyan undercut" which is believed to result from an interaction between the various emulsion layers comprising the color film and which expresses itself as a red fringing around foreground object details. An optimal Blue backing luminance is achieved at par with that of an 18% photographic grey card illuminated by the Standard Illuminant.

Given the discussions above, similar processes may be undertaken to obtain the other color versions.

Figure 7:
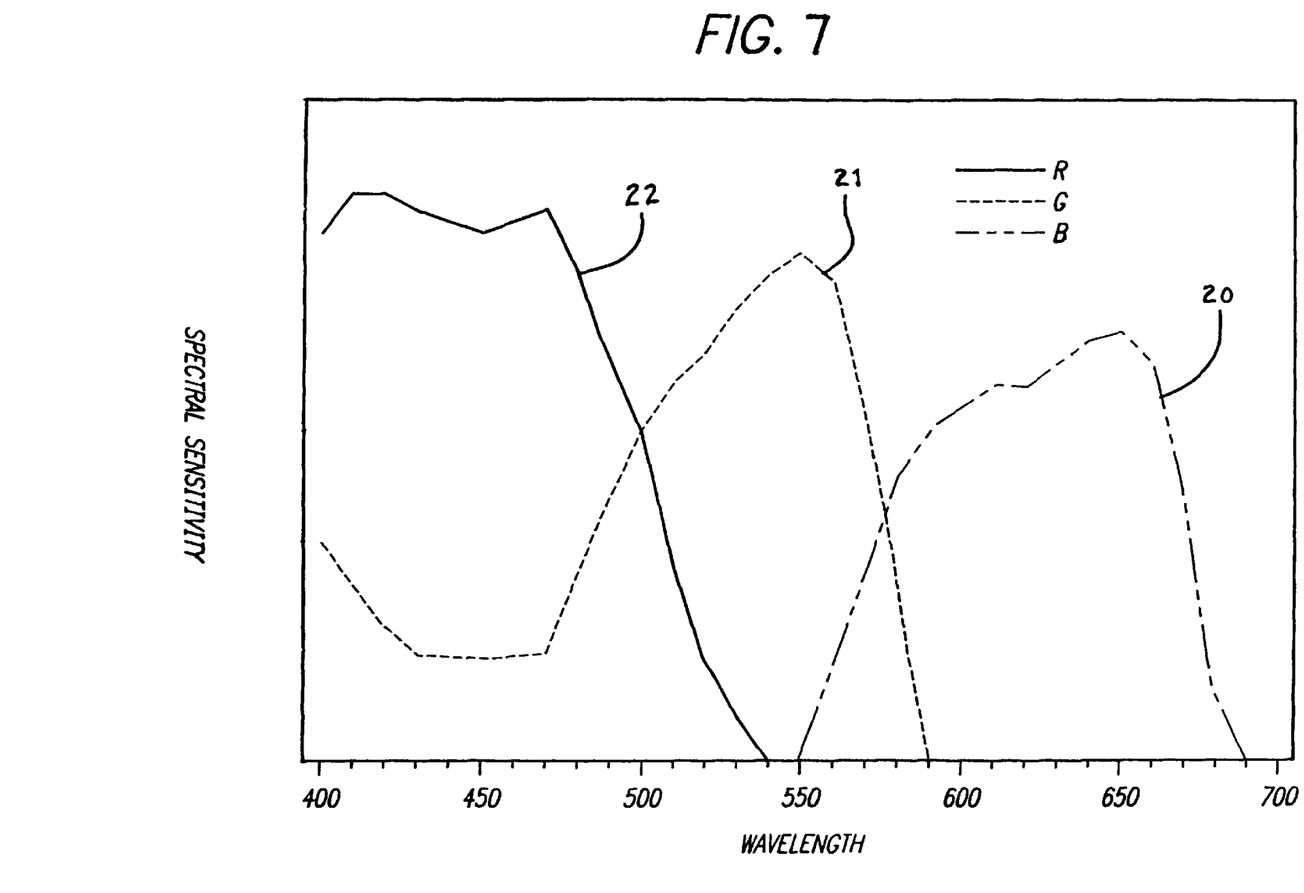
FIG. 7 is a graph showing the spectral sensitivity curves for Red, Green and Blue of a color negative.
Figure 8:
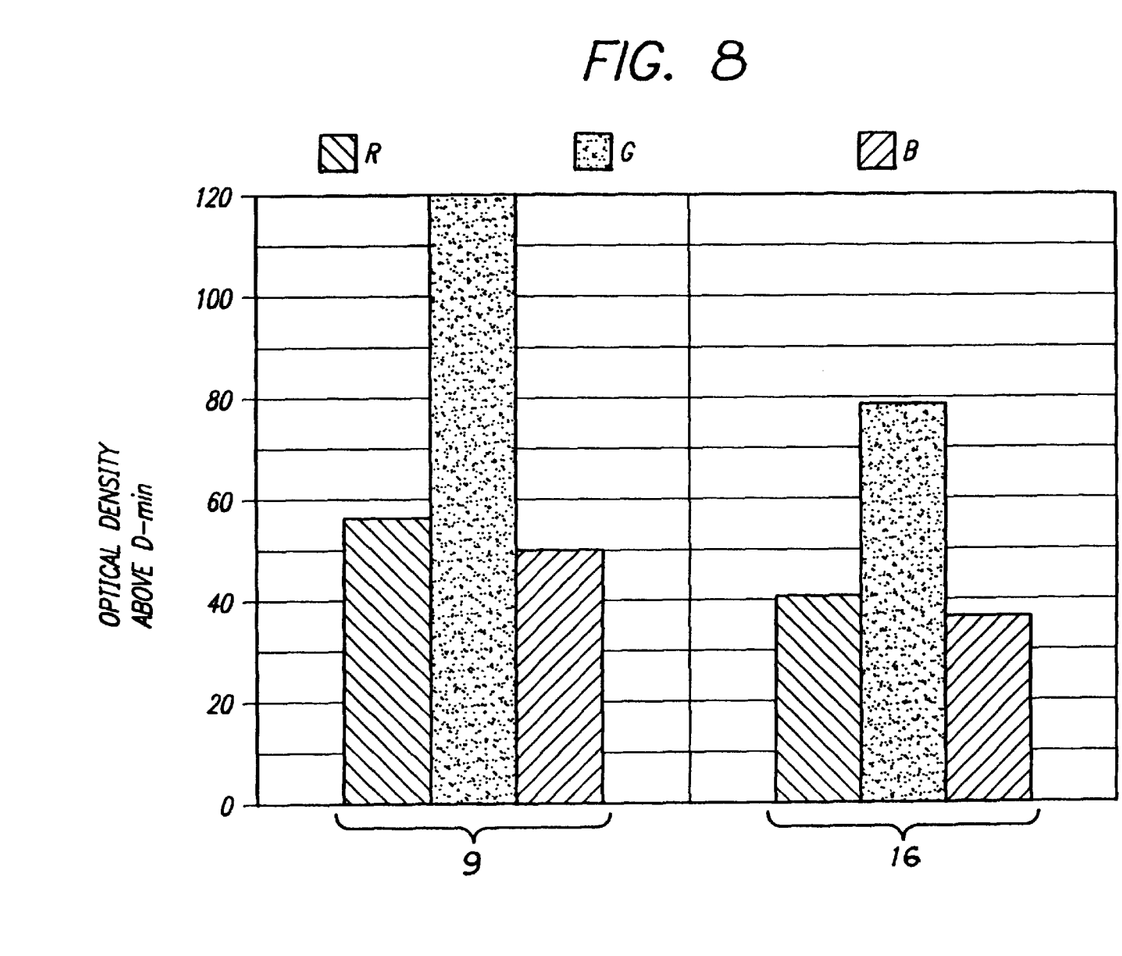
FIG. 8 illustrates sets of bar graphs comparing the optical densities above D-min for a negative exposed using a matte backing of the present invention and an industry standard matte backing.

In accordance with the process of traveling matte photography, the backing screen is photographed with a photographic film such as Eastman Kodak color negative EC 5293 having spectral sensitivity curves for Red (curve 20), Green (curve 21) and Blue (curve 22) illustrated in FIG. 7. The developed negative subsequently exhibits values illustrated in FIG. 8, graph 9. By comparison, the industry standard backing material, "Tempo" Green, having the spectral trace illustrated in FIG. 6, curve 15, when photographed with Eastman Kodak color negative film 5293 of illustration FIG. 7, the developed negative exhibits above D-min values illustrated in FIG. 8, curve 16.

Further discussions relating to fluorescence matte backing is found in copending U.S. patent application Ser. No. 08/729,630, which is fully incorporated by reference herein.

Thus a backing screen has been disclosed having particular use in composite photography including a plurality of buoyant essentially hexagonal shapes treated with a dye and pigment formulation including fluorescence to achieve a specific color space coordinate, for the purpose of providing a precise chromatic actinic stimulus response for silver halide photographic film, or similar response for electronic imaging devices.

While the present invention has been described with reference to FIGS. 1 through 8, it should be understood that the figures are for illustration only, and should not be taken as limitations on the invention. It is contemplated that many changes and modifications may be made by one of ordinary skill in the art, to the materials and arrangements of elements disclosed without departing from the spirit and scope of the invention.

I claim:

1. A segment of a floating matte backing for composite photography, said segment comprising a floatable non-planar body having a surface which exhibits chrominance and luminance properties required of matte backings used for composite photography, said segment is sized and shaped such that when a plurality of said segments are disposed on a liquid surface, they float in an adjoining relationship to form a substantially continuous surface covering an area of the liquid surface.

2. The segment of claim 1 wherein the body has a polygon shaped perimeter.

3. The segment of claim 2 wherein the body has a generally hexagonal shaped perimeter.

4. The segment of claim 1 wherein the body has a generally oval section.

5. The segment of claim 1 wherein the body has a solid interior.

6. The segment of claim 1 wherein the body has a hollow interior.

7. The segment of claim 1 wherein the surface of the body exhibits fluorescence which in the presence of a visible spectrum illuminant.

8. The segment of claim 1 wherein the surface of the body exhibits a spectral characteristic substantially corresponding to one of the optimal spectral loci of FIG. 4.

9. The segment of claim 8 wherein the surface of the body exhibits a spectral characteristic such that a Kodak EC 5293 negative when exposed with the surface exhibits relative optical densities in the negative substantially corresponding to one of the sets of bar graphs in FIG. 5.

10. A floating matte backing for composite photography, comprising:

a plurality of segments each comprising a floatable body having a surface which exhibits chrominance and luminance properties required of matte backings used for composite photography, said plurality of segments are sized and shaped such that when said plurality of segments are disposed on a liquid surface, they float in an adjoining relationship to form a substantially continuous surface covering an area of the liquid surface.

11. The floating matte backing as in claim 10 wherein said plurality of segments will freely float on the liquid surface.

12. The floating matte backing as in claim 11 wherein said plurality of segments are structurally independent from each other.

13. The floating matte backing as in claim 10 further comprising frame means for facilitating maintaining said segments in an adjoining and free floating relationship.

14. The floating matte backing as in claim 13 wherein said frame means comprises a floating structure at the perimeter of the area of the liquid surface covered by said segments so as to restrain said segments within said area.

15. The floating matte backing of claim 10 wherein the surface of the body exhibits fluorescence which in the presence of a visible spectrum illuminant.

16. A matte process for underwater composite photography, comprising the steps of:

providing a floating matte backing which comprises a plurality of segments each comprising a floatable body having a surface which exhibits chrominance and luminance properties required of matte backings used for composite photography, said plurality of segments are sized and shaped such that when said plurality of segments are disposed on a liquid surface, they float in an adjoining relationship to form a substantially continuous surface covering an area of the liquid surface;

illuminating a foreground subject in the liquid with the matte backing in place;

exposing a film negative to the foreground subject and matte backing to form an image; and forming a matte from said image.

17. The matte process as in claim wherein the surface of the body exhibits fluorescence which in the presence of a visible spectrum illuminant.

* * * * *